United States Patent [19]
Yamazaki

[11] Patent Number: 5,654,752
[45] Date of Patent: Aug. 5, 1997

[54] IMAGING APPARATUS WITH MULTIPLE PICKUPS, PROCESSING AND DISPLAYS

[75] Inventor: Yasuyuki Yamazaki, Kanagawa-ken, Japan

[73] Assignee: Canon Kabushiki Kaisha, Tokyo, Japan

[21] Appl. No.: 746,152

[22] Filed: Nov. 6, 1996

Related U.S. Application Data

[60] Continuation of Ser. No. 394,624, Feb. 27, 1995, abandoned, which is a division of Ser. No. 132,666, Oct. 6, 1993, Pat. No. 5,448,294.

[30] Foreign Application Priority Data

Oct. 16, 1992 [JP] Japan .................. 4-278720

[51] Int. Cl.[6] .................................................. H04N 5/228
[52] U.S. Cl. .................. 348/208; 348/51; 348/222; 348/227; 348/262; 359/378; 359/466; 359/554; 359/557
[58] Field of Search .................... 348/47, 51, 227, 348/222, 208, 262, 239, 333; 359/363, 374, 378, 375, 407, 466, 470, 480, 554, 557; H04N 9/73, 5/232

[56] References Cited

U.S. PATENT DOCUMENTS

| | | | |
|---|---|---|---|
| 4,962,422 | 10/1990 | Ohtomo et al. | 348/51 |
| 5,095,365 | 3/1992 | Takatoo et al. | 348/208 |
| 5,101,269 | 3/1992 | Shelley et al. | 348/47 |
| 5,193,000 | 3/1993 | Lipton et al. | 348/51 |
| 5,282,044 | 1/1994 | Misawa et al. | 348/208 |
| 5,291,300 | 3/1994 | Ueda | 348/208 |
| 5,309,250 | 5/1994 | Giacometti | 359/554 |

*Primary Examiner*—John K. Peng
*Assistant Examiner*—Jeffrey S. Murrell
*Attorney, Agent, or Firm*—Robin, Blecker, Daley & Driscoll

[57] ABSTRACT

An imaging apparatus is disclosed which is integrally provided with two image pickup systems for respectively converting subject light into image signals and two displays for respectively displaying images relative to the image signals obtained by the two image pickup systems. In the disclosed imaging apparatus, since the operations of the two image pickup systems are synchronized, it is not necessary to insert an element, such as a prism, in each optical path. Further, since a common signal processing circuit is provided for performing predetermined processing of the image signals outputted from the two image pickup systems, the size of the imaging apparatus is reduced.

40 Claims, 5 Drawing Sheets

IMAGING APPARATUS WITH MULTIPLE PICKUPS, PROCESSING AND DISPLAYS

This is a continuation application under 37 CFR 1.62 of prior U.S. patent application Ser. No. 08/394,624 filed Feb. 27, 1995 now abandoned, which is a division of U.S. patent application Ser. No. 08/132,666, filed Oct. 6, 1992 (U.S. Pat. No. 5,448,294).

BACKGROUND OF THE INVENTION

1. Field of the Invention

The present invention relates to an imaging apparatus and, more particularly, to an imaging apparatus provided with two image pickup means.

2. Description of the Related Art

As one example of this kind of imaging apparatus, an optical binocular telescope has heretofore been known which can provide an observer a subject image having a visually preferable stereoscopic effect. The optical binocular telescope is arranged, for example, as shown in FIG. 5. The arrangement shown in FIG. 5 includes objective lens systems 41a and 42a, rectangular prisms 42a, 42b, 43a and 43b for folding their associated optical paths and for converting their respective inverted images into erecting images, eyepiece lens systems 44a, 44b, 45a, 45b, 46a and 46b, and optical paths 47a and 47b of the respective optical systems.

As shown in FIG. 5, the optical paths of subject lights which pass through the respective objective lens systems 41a and 41b are folded by the rectangular prisms 42a and 43a the rectangular prisms 42b and 43b. Accordingly, it is possible to convert the respective inverted images into erecting images, and it is also possible to reduce the overall length of a lens barrel (not shown) without reducing the lengths of the respective optical paths. The subject lights whose optical paths have been folded by the rectangular prisms 43a and 43b respectively reach the observer's eyes through the eyepiece lens systems 44a, 45a, 46a and 44b, 45b, 46b.

However, an optical binocular telescope, such as the above-described related-art example, has a number of problems. For example, since it is desirable that a subject image be observed with the naked eye as an erecting image, it is necessary to insert an element for converting an inverted image into an erecting image, for example, rectangular prisms such as the above-described ones, between each objective lens and its associated eyepiece lens. Also, if the size of the binocular telescope is to be reduced, it is necessary to reduce its lens barrel by inserting the rectangular prisms or the like into each optical path and folding the optical path.

Further, it is difficult for the observer to confirm various information as to photographing states, such as the magnification of the binocular telescope, while viewing a subject image.

SUMMARY OF THE INVENTION

It is, therefore, an object of the present invention to solve the above-described problems.

Another object of the present invention is to provide an imaging apparatus in which it is not necessary to insert an element, such as a prism, in an optical path.

To achieve the above-described objects, according to one aspect of the present invention, there is provided an imaging apparatus which comprises an apparatus body, two image pickup means for respectively converting subject light into image signals, two display means for respectively displaying images relative to the image signals obtained by the two image pickup means, the two image pickup means and the two display means being integrally provided in the apparatus body, and synchronizing means for synchronizing operations of the respective two image pickup means.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below in detail with reference to the accompanying drawings.

An imaging apparatus according to a first embodiment of the present invention will be described below with reference to FIG. 1.

Figure 1:
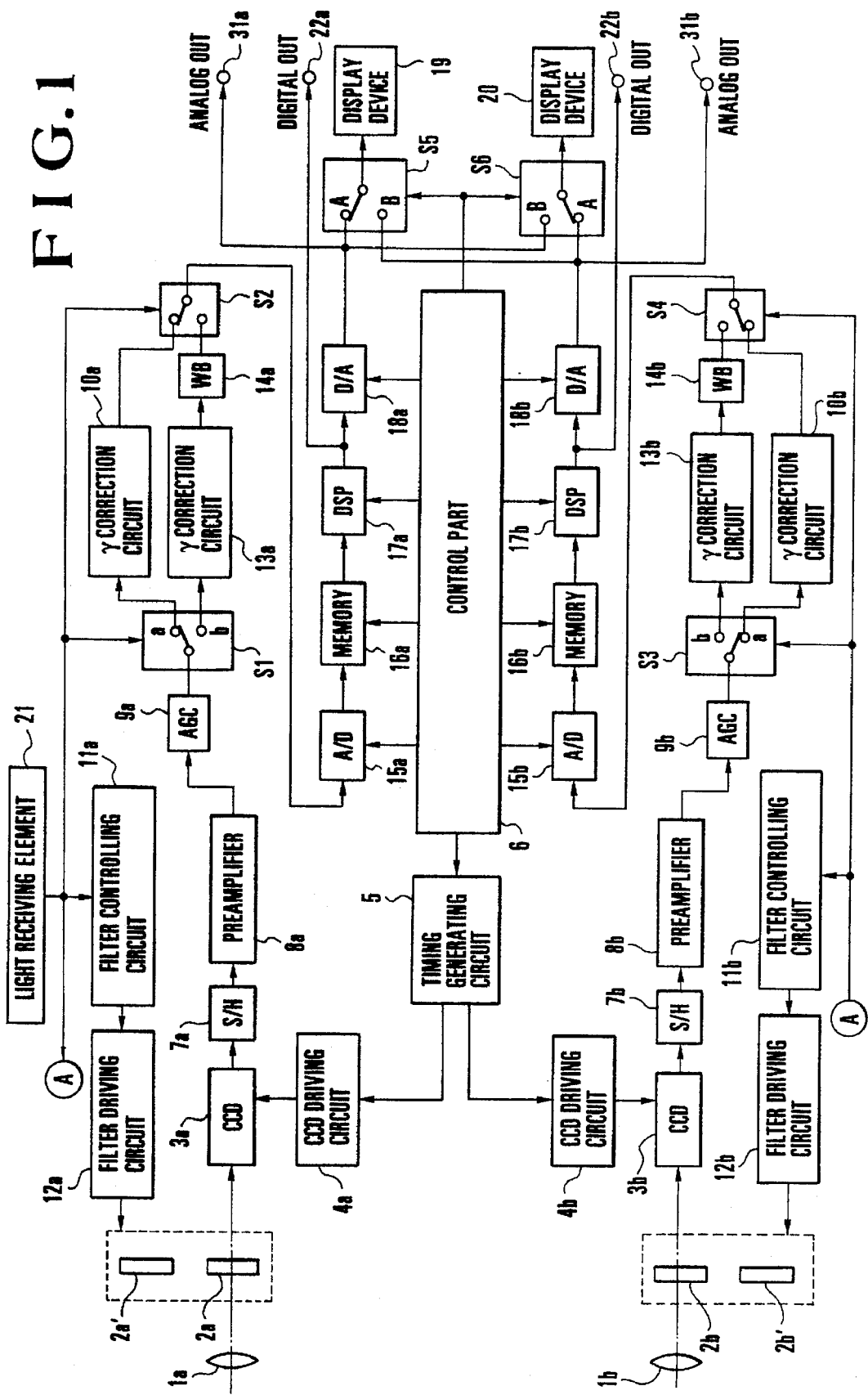
FIG. 1 is a block diagram showing the arrangement of an imaging apparatus according to one embodiment of the present invention.

FIG. 1 shows the first embodiment in which the present invention is applied to an electronic binocular telescope of a type different from the above-described optical binocular telescope.

Referring to FIG. 1, a light image of a subject is enlarged at a predetermined magnification by a lens part 1a, and the enlarged light image passes through an infrared cut filter 2a or an infrared transmission filter 2a'. The light image which has passed through the infrared cut filter 2a or the infrared transmission filter 2a' is converted into an electrical signal by an image pickup element 3a such as a CCD. At this time, a driving pulse produced by a timing generating circuit 5 is supplied to a CCD driving circuit 4a and the CCD 3a is driven by the output signal of the CCD driving circuit 4a. Incidentally, the CCD 3a is capable of effecting photoelectric conversion of not only an image of normal visible light but also an image of infrared light. The signal outputted from the CCD 3a is subjected to sample-and-hold processing in a sample-and-hold circuit 7a, and the output signal of the sample-and-hold circuit 7a is amplified at a predetermined gain by a preamplifier 8a. The output signal of the preamplifier 8a is controlled by an automatic gain control amplifier (hereinafter referred to as the "AGC amplifier") 9a so that the level of the output signal of the AGC amplifier 9a is set to a predetermined level in accordance with the level of its input signal.

A light receiving element 21 receives a subject light to determine the luminance level of the subject light, thereby outputting a signal indicative of either one of two levels which correspond to light and dark, respectively. A filter controlling circuit 11a receives the output signal of the light receiving element 21 and outputs a control signal to a filter driving circuit 12a. The filter driving circuit 12a selects the infrared cut filter 2a or the infrared transmission filter 2a' in accordance with the control signal. In this manner, in the first embodiment, if the output signal of the light receiving element 21 is of the "light" level, the infrared cut filter 2a is automatically selected, while if such output signal is of the "dark" level, the infrared transmission filter 2a' is automatically selected.

The output signal of the AGC amplifier 9a is sent to a gamma correction circuit 10a or a gamma correction circuit 13a by a switch S1. The switch S1 is arranged to switch between a terminal "a" and a terminal "b" in response to the output signal of the light receiving element 21. If the output signal of the light receiving element 21 is of the "light" level, the switch S1 is connected to the terminal "b", while if such output signal is of the "dark" level, the switch S1 is connected to the terminal "a".

More specifically, if the luminance level of a subject is high, the infrared cut filter 2a is employed, so that the input signal of the CCD 3a contains no infrared component. Accordingly, similarly to signal processing for an image of normal visible light, the output signal of the AGC amplifier 9a is subjected to gamma correction in the gamma correction circuit 13a, and the output signal of the gamma correction circuit 13a is subjected to white balance adjustment in a white balance control circuit (hereinafter referred to as the "WB circuit") 14a.

If the luminance level of the subject is low, the infrared transmission filter 2a' is employed, so that the input signal of the CCD 3 contains an infrared component as well. Accordingly, the aforesaid normal signal processing is not performed. More specifically, the output signal of the AGC amplifier 9a is only subjected to gamma correction in the gamma correction circuit 10a having a correction characteristic which is suited to signal processing for an image of infrared light, and WB (white balance) adjustment is not performed. This is because if a signal containing an infrared component is subjected to WB adjustment, the levels of its color components (R, G, B) are adjusted to levels utterly different from their respective actual levels.

A switch S2 selects the output signal of the gamma correction circuit 10a or that of the WB circuit 14a on the basis of the output signal of light receiving element 21 similarly to the switch S1, and outputs the selected signal.

The output signal of the switch S2 is converted from analog to digital by an A/D conversion circuit 15a, and the digital signal is stored in a buffer memory 16a. The signal stored in the buffer memory 16a is read out and subjected to predetermined digital signal processing in a digital signal processor 17a. The output signal of the digital signal processor 17a is converted from digital to analog by a D/A conversion circuit 18a. The output signal of the digital signal processor 17a is also sent to an output terminal 22a, and is then outputted from the output terminal 22a to external equipment such as a digital VTR. At this time, each of the elements 15a, 16a, 17a and 18a is controlled by a control signal supplied from a control part 6. The shown electronic binocular telescope includes another signal processing system made up of constituent elements 1b to 18b similar to those of the above-described signal processing system. The constituent elements 1b to 18b perform functions and operations similar to those of the respective constituent elements indicated by the corresponding reference numerals accompanied by "a". Detailed description of the constituent elements 1b to 18b is, therefore, omitted.

The signals which have been converted from digital to analog by the D/A conversion circuits 18a and 18b are respectively outputted to selecting switches S5 and S6 and are also supplied to analog output terminals 31a and 31b, respectively. The selecting switches S5 and S6 are normally controlled by the control part 6 so that they are connected to their terminals A. Thus, the output signal of the CCD 3a is selected by the selecting switch S5, while the output signal of the CCD 3b is selected by the selecting switch S6, and the selected signals are respectively outputted from the selecting switches S5 and S6. The output signal of the respective selecting switches S5 and S6 are inputted to display devices 19 and 20, such as liquid crystal displays, and images relative to the input signals are respectively displayed on the display devices 19 and 20.

If the selecting switches S5 and S6 are connected to their respective terminals B, it is possible to display the image relative to the output signal of the CCD 3a on the liquid crystal display 20 and the image relative to the output signal of the CCD 3b on the liquid crystal display 19. Also, if the selecting switch S5 is connected to the terminal A and the selecting switch S6 is connected to the terminal B, it is possible to display the image relative to the output signal of the CCD 3a on each of the liquid crystal displays 19 and 20. Also, if the selecting switch S5 is connected to the terminal B and the selecting switch S6 is connected to the terminal A, it is possible to display the image relative to the output signal of the CCD 3b on each of the liquid crystal displays 19 and 20.

According to the first embodiment, since the electronic binocular telescope having the above-described arrangement is realized, it is not necessary to insert an element, such as a prism, in either of the optical paths of the imaging apparatus. Further, it is possible to easily perform processing such as the processing of effecting switching between images displayed on the two liquid crystal displays 19 and 20 or the processing of displaying an identical image on each of the liquid crystal displays 19 and 20. It is also possible to easily realize a reduction in the size of the imaging apparatus.

Further, when subject light is to pass through the filter 2a or 2a' and the filter 2b or 2b' before reaching the CCDs 3a and 3b, the filters 2a and 2a'; 2b and 2b' are automatically interchanged according to the luminance of the subject and signal processing suited to the light transmitted through each of the selected filters is carried out. Accordingly, it is possible to provide an image which is more preferable in visual terms.

A second embodiment of the present invention will be described below with reference to FIG. 2.

Figure 2:
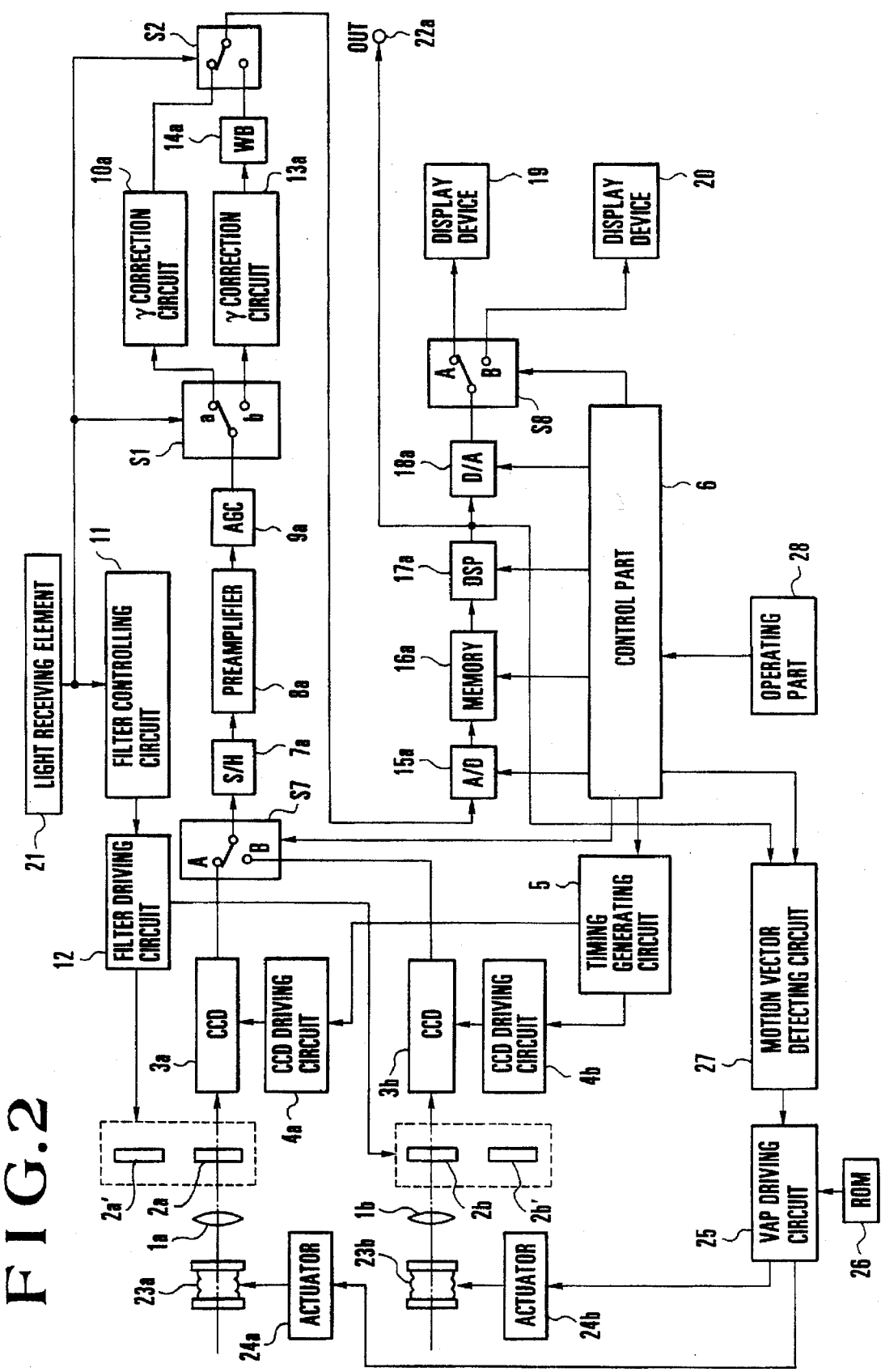
FIG. 2 is a block diagram showing the arrangement of an imaging apparatus according to another embodiment of the present invention.

FIG. 2 is a block diagram showing the arrangement of an imaging apparatus according the second embodiment of the present invention. In FIG. 2, the same reference numerals are used to denote constituent elements similar to those shown in FIG. 1, and detailed description thereof is omitted.

The arrangement shown in FIG. 2 further includes variable angle prisms (VAPs) 23a and 23b. In each of the VAPs 23a and 23b, for example, the gap between two parallel flat glasses is charged with a liquid of high refractive index and hermetically enclosed with a rubber bellows or the like. Each of the VAPs 23a and 23b is arranged to vary its apex angle by varying the angles of the parallel flat glasses, thereby enabling correction of an image shake.

A motion vector detecting circuit 27 obtains the motion vector of an image from a digital image signal outputted from the DSP (digital signal processor) 17a, thereby detecting an image shake. Then, the motion vector detecting circuit 27 outputs a control signal to a VAP driving circuit 25 to correct the image shake (to cancel the motion vector). Then, the VAP driving circuit 25 reads out data for correcting the operational errors of the VAPs 23a and 23b which result from their respective individual differences, from a ROM 26 in which the data is stored in advance, applies the required correction to the control signal, and outputs the control signal to each actuator 24a and 24b. The actuators 24a and 24b apply loads to the predetermined peripheral portions of the respective VAPs 23a and 23b to cause the corresponding optical axes to incline laterally and horizontally, thereby correcting the shakes of the associated optical images with respect to any direction.

The subject lights which have been subjected to the image-shake correction by the respective VAPs 23a and 23b are converted into electrical signals by the CCDs 3a and 3b in the previously-described manner. The output signals of the CCDs 3a and 3b are supplied to a selecting switch S7. The selecting switch S7 switches to alternately output the output signals of the CCDs 3a and 3b to the next stage in accordance with a certain timing determined by the control part 6, for example, at intervals of 1/60 second. Thus, the output signals of the CCDs 3a and 3b are alternately outputted from the selecting switch S7 at intervals of 1/60 second.

Subsequently, the output signal of the selecting switch S7 passes through a signal processing system similar to that shown in FIG. 1 and is inputted to a selecting switch S8. The switching timing of the selecting switch S8 is normally synchronized with the switching timing of the selecting switch S7 which is determined by the control part 6. Accordingly, the output signal of the D/A conversion circuit 18a is classified into the output signal of the CCD 3a and the output signal of the CCD 3b. Then, the output signal of the selecting switch S8 is supplied to either of the liquid crystal displays 19 and 20 and an image relative to the input signal of either of the display devices 19 and 20 is displayed.

During this operation, the image signal is only supplied to each of the liquid crystal displays 19 and 20 at intervals of 1/60 second. However, since the liquid crystal displays 19 and 20 can hold their current displayed images until the next image signals are supplied, the images on the liquid crystal displays 19 and 20 are displayed without interruption.

Also, by controlling the selecting switch S7 and the selecting switch S8, it is possible to arbitrarily display the images relative to the output signals of the CCDs 3a and 3b on the liquid crystal displays 19 and 20.

For example, the selecting switch S7 and the selecting switch S8 may be controlled so that the selecting switch S8 is connected to its terminal B during the interval that the selecting switch S7 is connected to its terminal A, whereas the selecting switch S8 is connected to its terminal A during the interval that the selecting switch S7 is connected to its terminal B. In this case, it is possible to display the image relative to the output signal of the CCD 3a on the liquid crystal display 19 and the image relative to the output signal of the CCD 3b on the liquid crystal display 20. If the selecting switch S7 and the selecting switch S8 are connected to the respective terminals A, it is possible to display the image relative to the output signal of the CCD 3a on each of the liquid crystal displays 19 and 20 at the same time. If the selecting switch S7 and the selecting switch S8 are connected to the respective terminals B, it is possible to display the image relative to the output signal of the CCD 3b on each of the liquid crystal displays 19 and 20 at the same time.

In the second embodiment, the charge storage time of each of the CCDs 3a and 3b is selected to be 1/60 second, as described previously. However, the charge storage time can be arbitrarily set by means of an operating part 28. In other words, by varying the charge storage time of each of the CCDs 3a and 3b, it is possible to realize a so-called electronic shutter function. While the electronic shutter function is being operated, the switching timing of each of the selecting switches S5 and S6 is also varied according to the read-out timing of each of the CCDs 3a and 3b.

The operating part 28 is also provided with a key (not shown) for turning on and off an image-shake preventing function, and an operator can specify whether to execute image-shake prevention, by operating the key. The operating part 28 is further provided with a distance measuring key, a magnification varying key and other keys as will be described later.

According to the arrangement of the second embodiment, not only is it possible to achieve effects and advantages similar to those of the first embodiment described above, but also it is possible to remarkably reduce the required circuit scale since the output signals of the respective CCDs 3a and 3b are processed by a common circuit.

Also, since the charge storage time of each of the CCDs 3a and 3b can be varied, it is possible to provide an image of optimum luminance at all times by varying a shutter speed in accordance with the luminance of a subject.

Further, an image shake due to a camera shake can be corrected by the VAPs 23a and 23b, whereby it is possible to prevent a degradation in image quality.

An imaging apparatus according to a third embodiment of the present invention will be described below with reference to FIG. 3.

Figure 3:
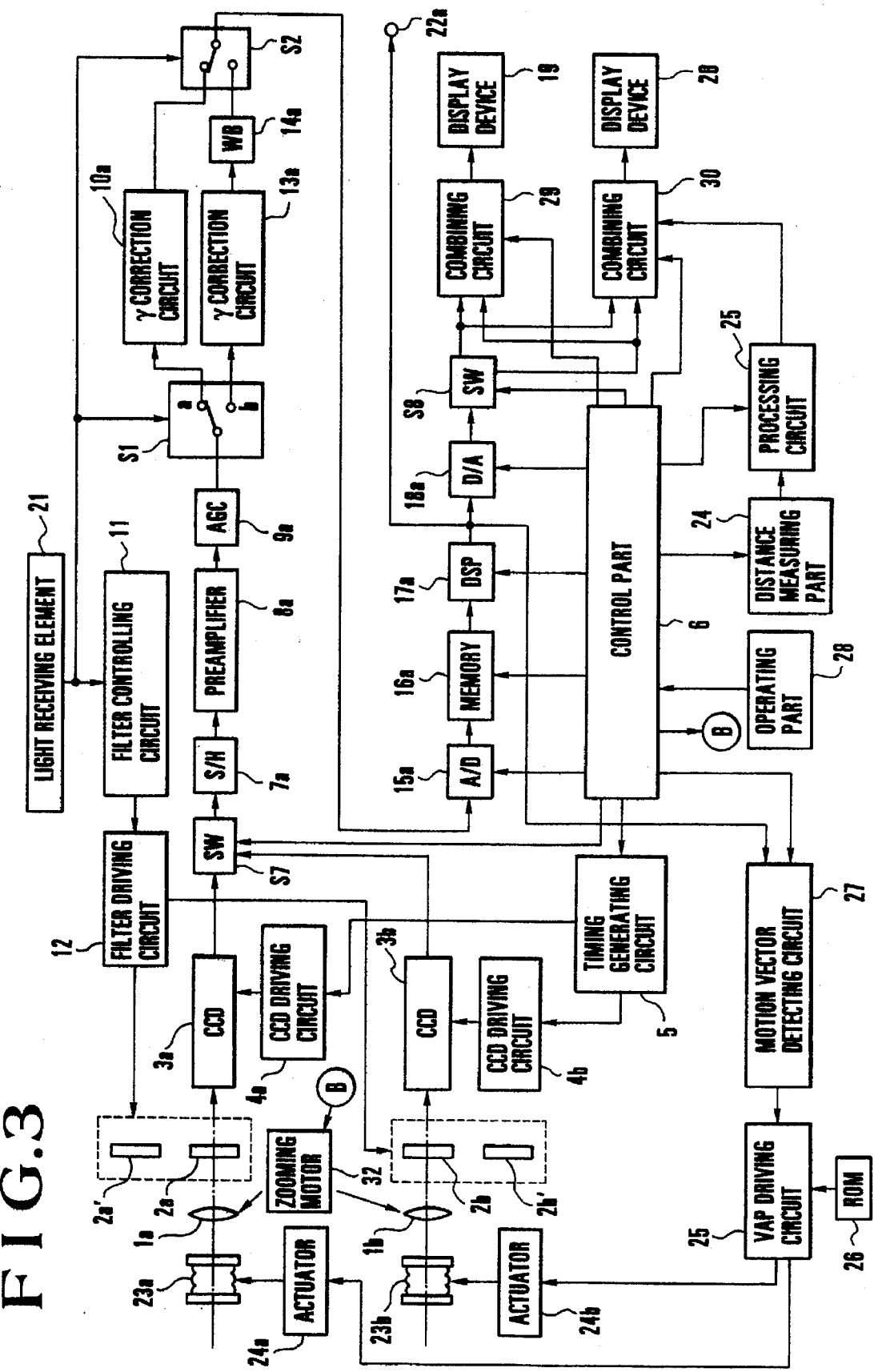
FIG. 3 is a block diagram showing the arrangement of an imaging apparatus according to yet another embodiment of the present invention.

FIG. 3 shows the third embodiment of the present invention. In FIG. 3, the same reference numerals are used to denote constituent elements similar to those shown in FIGS. 1 and 2, and detailed description thereof is omitted.

The output signal of the switch S8 is sent to each of picture combining circuits 29 and 30. The picture combining circuits 29 and 30 are controlled by the control part 6 to normally output their input signals to the respective liquid crystal displays 19 and 20 without modification. If the operator operates the operating part 28 to select the function of displaying a subsidiary picture in combination with another picture, a control signal for displaying a subsidiary picture in combination with another picture is outputted from the control part 6 to each of the picture combining circuits 29 and 30. The picture combining circuits 29 and 30 which have received the control signal can display one picture as a subsidiary picture in a picture displayed on each of the liquid crystal displays 19 and 20. For example, it is possible to display on the liquid crystal display 19 an image relative to the output signal of the CCD 3a as a primary picture and the output signal of the CCD 3b as a subsidiary picture.

It is also possible to display a distance to a subject as a subsidiary picture by means of the arrangement shown in FIG. 3 by way of example. In the shown arrangement, there is provided a distance measuring part 24 which is means capable of measuring a distance to a subject, and when the operator operates the distance measuring key of the operating part 28, the control part 6 outputs a control signal for distance measurement to the distance measuring part 24. A distance information processing circuit 25 converts distance information outputted from the distance measuring part 24 into a signal of a form which is suitably displayed on the liquid crystal display 20, and outputs the signal to a picture combining circuit 30. Then, the signal indicative of the distance information is combined with the output signal of the CCD 3a or 3b by the picture combining circuit 30 which has received the control signal from the control part 6. Thus, the distance to the subject is displayed on the liquid crystal display 20 as the subsidiary picture. Accordingly, an observer can know the distance to the subject while viewing an image displayed in the binocular telescope. Although the distance information is displayed on only the liquid crystal display 20, it is also possible to display the distance information on the liquid crystal display 19 by outputting the signal indicative of the distance information to the picture combining circuit 29 as well and combining the signal in the above-described manner.

Also, by operating a zooming operating key of the operating part 28, a zooming motor 32 is driven via the control part 6 to move lens parts 1a and 1b, whereby the magnification of the subject image can be varied.

Further, by operating an operating key of the operating part 28, a signal indicative of the magnification of the binocular telescope and a signal indicative of the size of the subject obtained through a calculation performed by the control part 6 on the basis of the magnification or a signal indicative of the luminance, etc. of the subject can be outputted to and combined with the subject image by the picture combining circuit 30. Thus, it is possible to display the distance information indicative of the distance to the subject, the magnification of the binocular telescope, the size of the subject, the luminance of the subject or other information in the subsidiary picture on the liquid crystal display 20.

Figure 4:
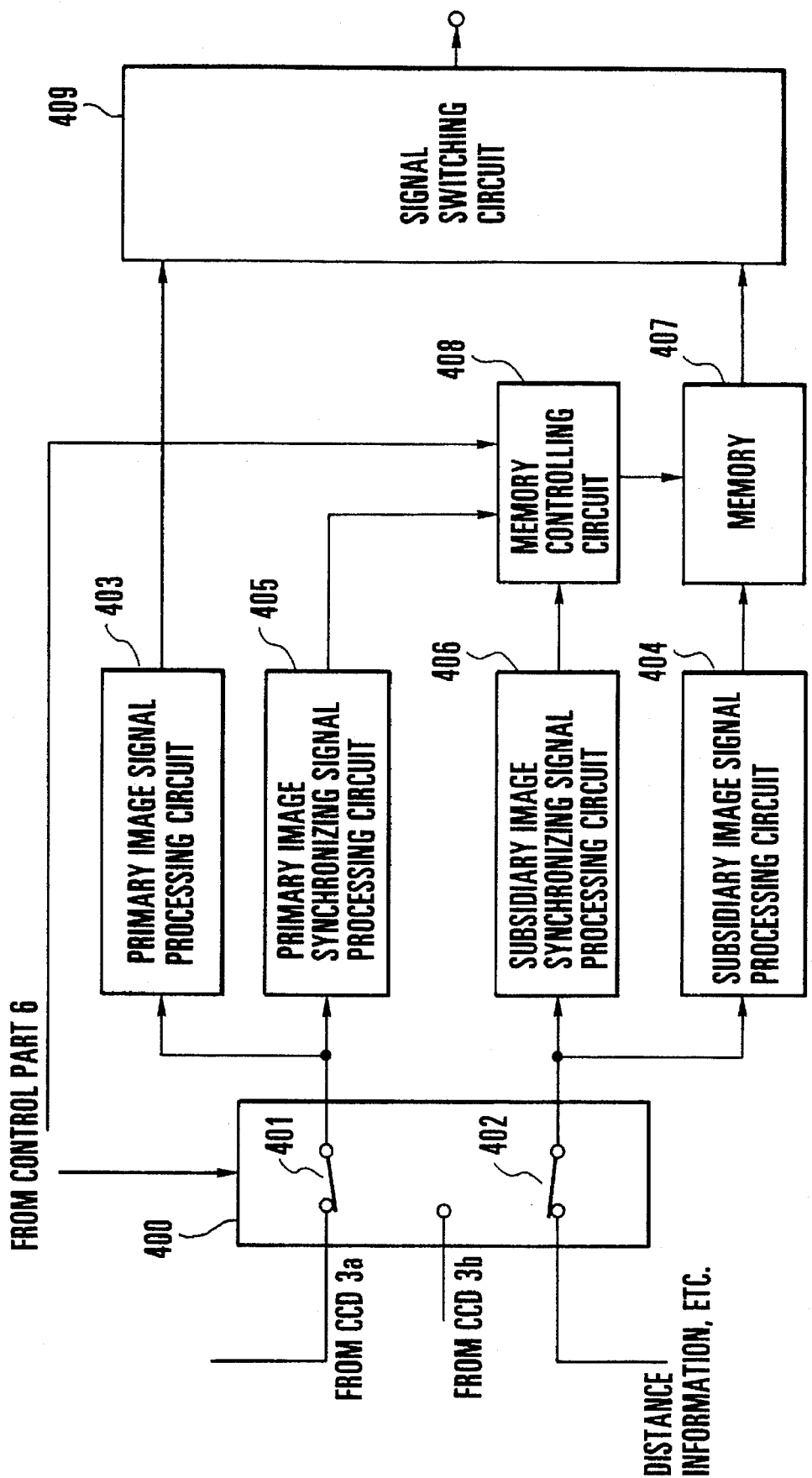
FIG. 4 is a block diagram showing an arrangement example of a combining circuit used in the apparatus shown in FIG. 3.
Figure 5:
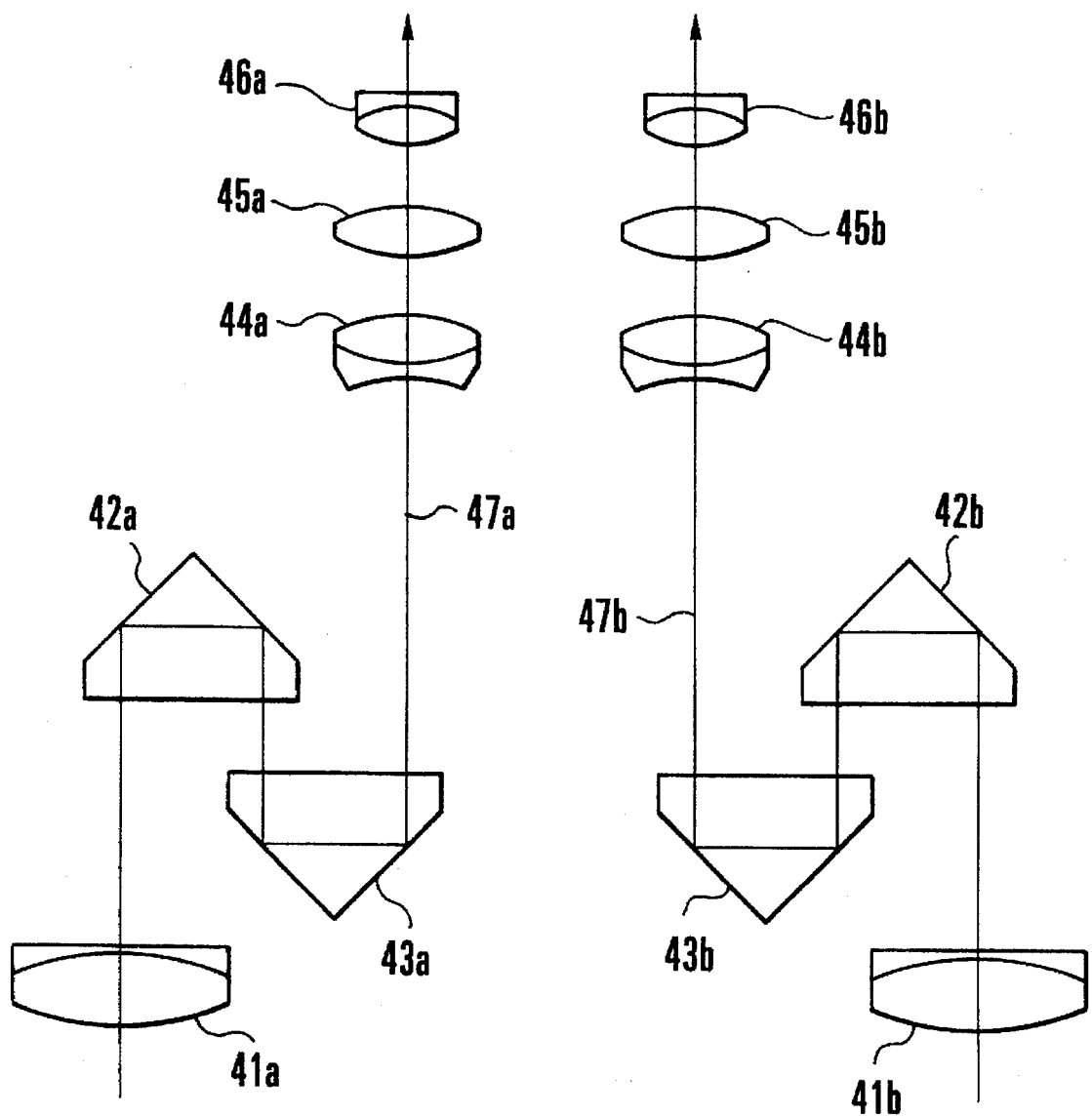
FIG. 5 is a schematic view showing the arrangement of an optical binocular telescope according to a related art.

One example of either of the picture combining circuits 29 and 30 will be described below with reference to FIG. 4. Referring to FIG. 4, a terminal 401 is an input terminal for inputting an image signal for the primary picture, while a terminal 402 is an input terminal for inputting an image signal for the subsidiary picture. The output signals from the CCDs 3a and 3b are appropriately selected by and inputted through the input terminals 401 and 402, respectively. If the aforesaid distance information, magnification and others are to be displayed, the output signal of the CCD 3a or 3b is inputted to the input terminal 401, while the signals indicative of the distance information, the magnification and others are inputted to the input terminal 402. Selection from among the signals inputted to the input terminals 401 and 402 is performed by a switch part 400 which has received a control signal outputted from the control part 6.

The signal inputted through the input terminal 401 is supplied to both a primary image signal processing circuit 403 and a primary image synchronizing signal processing circuit 405, while the signal inputted through the input terminal 402 is supplied to both a subsidiary image signal processing circuit 404 and a subsidiary image synchronizing signal processing circuit 406. Synchronizing signals are formed from the respective input signals by the primary image synchronizing signal processing circuit 405 and the subsidiary image synchronizing signal processing circuit 406, and are outputted to a memory controlling circuit 408. The output signal of the subsidiary image signal processing circuit 404 is subjected to compression in a memory 407 so that the subsidiary picture is compressed vertically and horizontally. These operations are performed by executing low-speed writing to and high-speed reading from the memory 407 as well as address control thereof under the control of the memory controlling circuit 408. The writing and the reading of the subsidiary image signal are synchronized with the primary image signal by the aforesaid synchronizing signal.

Thus, the output signal of the subsidiary image signal processing circuit 404 is formed into an image signal indicative of a picture of reduced size, and the image signal is combined with the output signal of the primary image signal processing circuit 403 by a signal switching circuit 409 as if the picture indicated by the image signal were fitted into the picture indicated by the output signal of the primary image signal processing circuit 403. The resultant image signal is outputted to the liquid crystal displays 19 and 20. Also, since the memory controlling circuit 408 receives the control signal from the control part 6 and performs writing to the memory 407, if the picture combining function is inoperative, the primary image signal is outputted without modification.

As is apparent from the above description, in accordance with the third embodiment, various useful information different from a subject image can be displayed in the subsidiary picture (or the primary picture) on each of the liquid crystal displays 19 and 20.

Also, if the CCD driving circuits 4a and 4b of the timing generating circuit 5 is controlled to vary the readout timing of each of the CCDs 3a and 3b so that the output signal therefrom is read out at intervals of 1/120 second, i.e., half the aforesaid interval of 1/60 second, it is possible to suppress a flicker occurring due to switching between the right and left images. In this case, it is preferable to vary the switching timing of each of the selecting switches S7 and S8.

What is claimed is:

1. An imaging apparatus, comprising:
   (a) an apparatus body;
   (b) two image pickup means for respectively converting subject light into image signals, each of said two image pickup means including a magnification system for varying a magnification of said image;
   (c) two display means for respectively displaying images relative to the image signals obtained by said two image pickup means, said two image pickup means and said two display means being integrally provided in said apparatus said two display means being capable of displaying information relative to a photographing state other than the images relative to the image signals obtained by said two image pickup means, the information relative to the photographing state including magnifications of said respective two image pickup means.

2. An imaging apparatus, comprising:
   (a) an apparatus body;
   (b) two image pickup means for respectively converting subject light into image signals;
   (c) two display means for respectively displaying images relative to the image signals obtained by said two image pickup means, said two image pickup means and said two display means being integrally provided in said apparatus body, said two display means being capable of displaying information relative to a photographing state other than the images relative to the image signals obtained by said two image pickup means, the information relative to the photographing state including a distance to a subject and/or a luminance of the subject light.

3. An imaging apparatus comprising:
   (a) an apparatus body;
   (b) two image pickup means for respectively converting subject light into image signals;

(c) signal processing means for performing processing of the image signals obtained by said two image pickup means;

(d) two display means for respectively displaying images relative to the image signals generated by said two image pickup means and subjected to the processing performed by said signal processing means; said two image pickup means, said signal processing means and said two display means being integrally provided in said apparatus body;

(e) characteristic switching means for switching a characteristic of said signal processing means in accordance with a photographing state; and (f) two shake correcting means providing for said respective two image pickup means and arranged to correct shakes of associated subject images, said two shake correcting means synchronously performing the shake correction operations.

4. An imaging apparatus comprising:

(a) two image pickup means for respectively converting subject light into image signals;

(b) signal processing means for performing processing of the image signals obtained by said two image pickup means;

(c) two display means capable of respectively displaying images relative to the image signals generated by said two image pickup means and subjected to the processing performed by said signal processing means;

(d) two shake correcting means provided for said respective two image pickup means and arranged to correct shakes of associated subject images;

(e) control means for controlling operations of said two image pickup means, operations of said signal processing means and operations of said two shake correcting means, respectively;

(f) output means for externally outputting the image signals obtained by said two image pickup means; and (g) characteristic switching means for interlockingly switching characteristics of said respective two image pickup means and a characteristic of said signal processing means.

5. A viewing apparatus comprising:

(a) a plurality of image forming optics for forming a plurality of optical images;

(b) a plurality of viewing means for viewing said plurality of images;

(c) a plurality of image stabilizing members for stabilizing said optical image viewed by said plurality of viewing means respectively;

(d) detection means for detecting a shake of said viewing apparatus and for forming a common detection signal; and (e) driving means for driving said plurality of image stabilizing members in response to said common detection signal.

6. An apparatus according to claim 5, wherein said plurality of viewing means comprise display members.

7. An apparatus according to claim 5, wherein said plurality of viewing means comprise liquid crystal display members.

8. An apparatus according to claim 5, wherein said image stabilizing member includes an optical stabilizing member for stabilizing said optical image.

9. An apparatus according to claim 5, wherein said image stabilizing member includes a variable angle prism.

10. An apparatus according to claim 5, wherein said plurality of viewing means include a plurality of image pickup means for picking up said optical images respectively.

11. An apparatus according to claim 5, wherein said drive means includes a memory for compensating the characteristic difference between said plurality of image stabilizing members.

12. An apparatus according to claim 5, wherein said viewing apparatus is a binocular.

13. An apparatus according to claim 5, wherein said plurality of image forming optics form a common object image.

14. A binocular apparatus comprising:

(a) a plurality of image forming optics for forming a plurality of optical images;

(b) a plurality of viewers for viewing said plurality of images;

(c) a plurality of image stabilizing members for stabilizing said optical images viewed by said plurality of viewers respectively;

(d) detection means for detecting a shake of said binocular apparatus and for forming a common detection signal; and (e) drive means for driving said plurality of image stabilizing members in response to said common detection signal.

15. An apparatus according to claim 14, wherein said plurality of viewers comprise display members.

16. An apparatus according to claim 14, wherein said plurality of viewers comprise liquid crystal display members.

17. An apparatus according to claim 14, wherein said image stabilizing member includes an optical stabilizing member for stabilizing said optical image.

18. An apparatus according to claim 14, wherein said image stabilizing member includes a variable angle prism.

19. An apparatus according to claim 14, wherein said drive means includes a memory for compensating the characteristic difference between said plurality of image stabilizing members.

20. An apparatus according to claim 14, wherein said plurality of image forming optics form a common object image.

21. A binocular apparatus comprising:

(a) a pair of image forming optics for forming a pair of optical images;

(b) a pair of viewing finders for viewing said pair of images;

(c) a pair of image stabilizing members for stabilizing optical images viewed by said pair of said viewing finders respectively;

(d) detection circuit means for detecting a shake of said binocular apparatus and for forming a common detection signal; and (e) drive circuit means for driving said pair of image stabilizing members in response to said common detection signal.

22. A binocular apparatus according to claim 21, wherein said pair of viewing finders comprise display devices.

23. A binocular apparatus according to claim 21, wherein said pair of viewing finders comprise liquid crystal display devices.

24. A binocular apparatus according to claim 21, wherein said image stabilizing member includes an optical stabilizing member for stabilizing said optical image.

25. A binocular apparatus according to claim 21, wherein said image stabilizing member includes a variable angle prism.

26. A binocular apparatus according to claim 21, further comprising a plurality of image pickup devices for picking up said optical images respectively.

27. A binocular apparatus according to claim 21, wherein said drive circuit means include a memory for compensating the characteristics difference between said pair of image stabilizing members.

28. A binocular apparatus according to claim 21, wherein said pair of image forming optics form a common object image.

29. A binocular apparatus according to claim 21, wherein said drive circuit means concurrently drive said pair of image stabilizing members.

30. A binocular apparatus according to claim 21, wherein said drive circuit means cooperatively drive said pair of image stabilizing members.

31. A viewing apparatus comprising:
   (a) a plurality of image forming optical systems for forming a plurality of optical images;
   (b) a plurality of viewing members for viewing said plurality of images formed by said plurality of image forming optical systems;
   (c) a plurality of image stabilizing means for stabilizing said image viewed by said viewing members;
   (d) drive means for driving said plurality of image stabilizing means; and
   (e) a compensation means for compensating a characteristic difference between said plurality of stabilizing means.

32. An apparatus according to claim 31, wherein said plurality of viewing members comprise image display members.

33. An apparatus according to claim 31, wherein said plurality of viewing members comprise liquid crystal display members.

34. An apparatus according to claim 31, wherein said plurality of image stabilizing means include a plurality of optical stabilizing members for respectively stabilizing said plurality of images.

35. An apparatus according to claim 34, wherein said optical stabilizing member comprises a variable angle prism.

36. An apparatus according to claim 31, further comprising motion detecting means for detecting a motion of said apparatus.

37. An apparatus according to claim 36, wherein said drive means drives said plurality of image stabilizing means according to an output of said motion detecting means.

38. An apparatus according to claim 31, wherein said compensation means include a memory for compensating the characteristic difference between said plurality of stabilizing means.

39. An apparatus according to claim 31, wherein said plurality of image forming optical systems, said plurality of viewing members, said plurality of image stabilizing means, said drive means and said compensation means are integrally provided in an apparatus body.

40. An apparatus according to claim 31, wherein said viewing apparatus is a binocular.

* * * * *

UNITED STATES PATENT AND TRADEMARK OFFICE
CERTIFICATE OF CORRECTION

PATENT NO. : 5,654,752
DATED : August 5, 1997
INVENTOR(S) : Yamazaki, Yasuyuki

It is certified that error appears in the above-identified patent and that said Letters Patent is hereby corrected as shown below:

| Col 1, line 7, | delete "1992" | and insert -- 1993 --. |
| Col 5, line 42, | delete "until-the" | and insert -- until the --. |
| Col 8, line 42, | after "apparatus" | insert -- body --. |

Signed and Sealed this

Fourteenth Day of July, 1998

Attest:

BRUCE LEHMAN

Attesting Officer

Commissioner of Patents and Trademarks